UNITED STATES PATENT OFFICE.

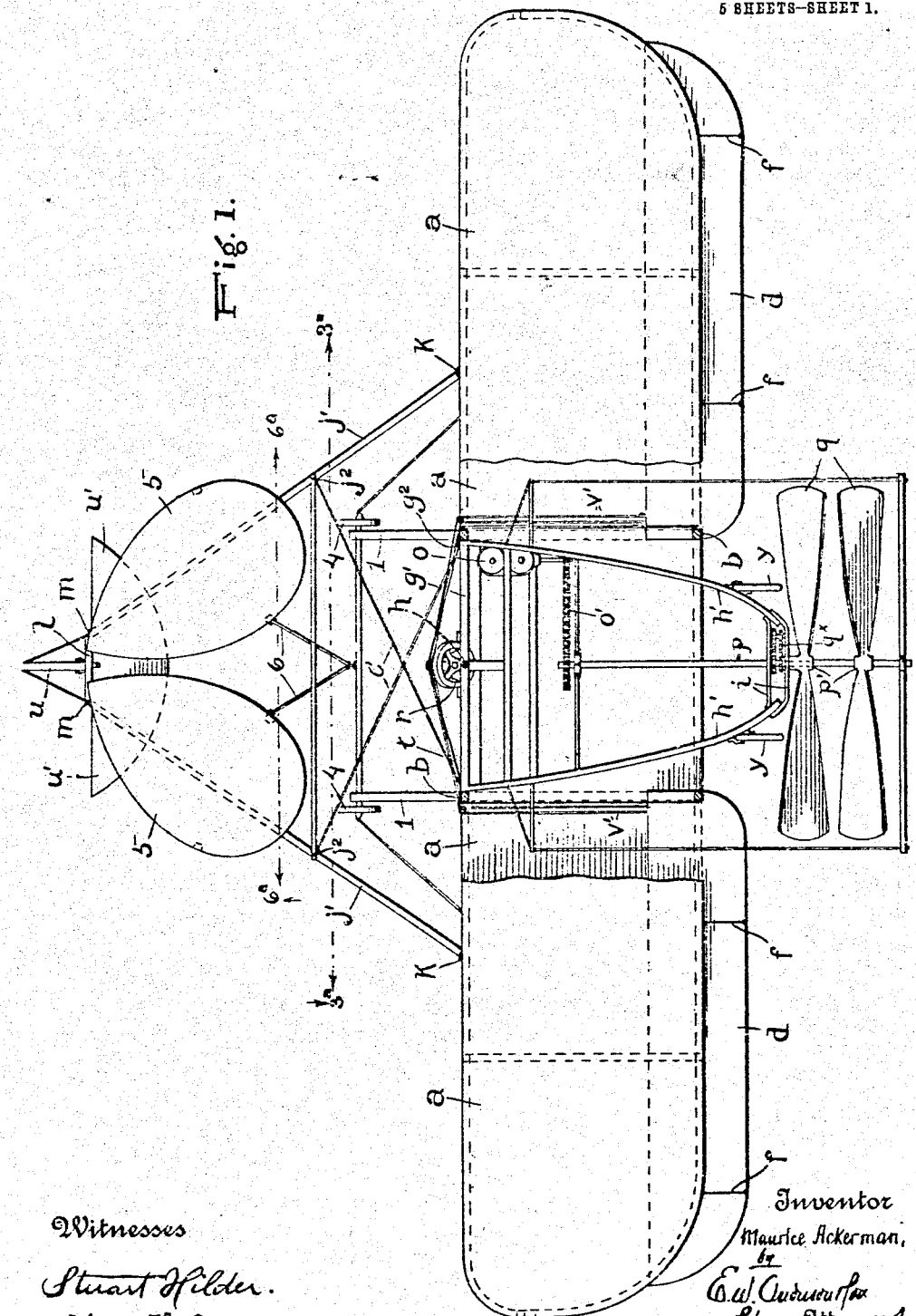

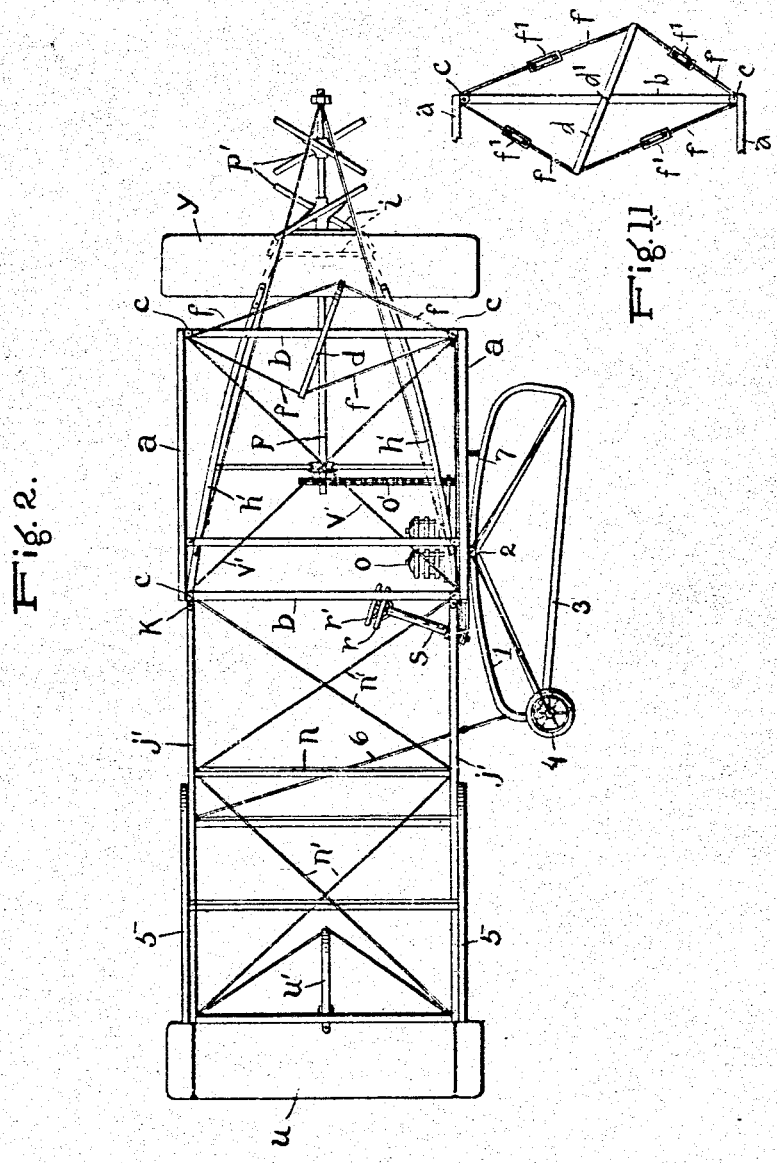

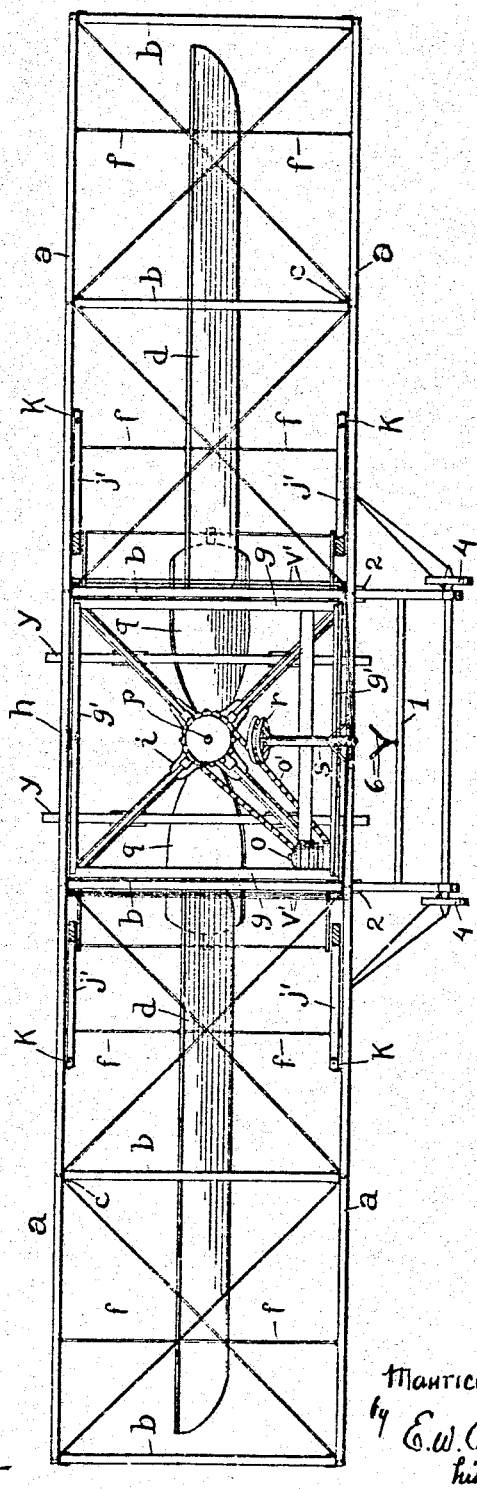

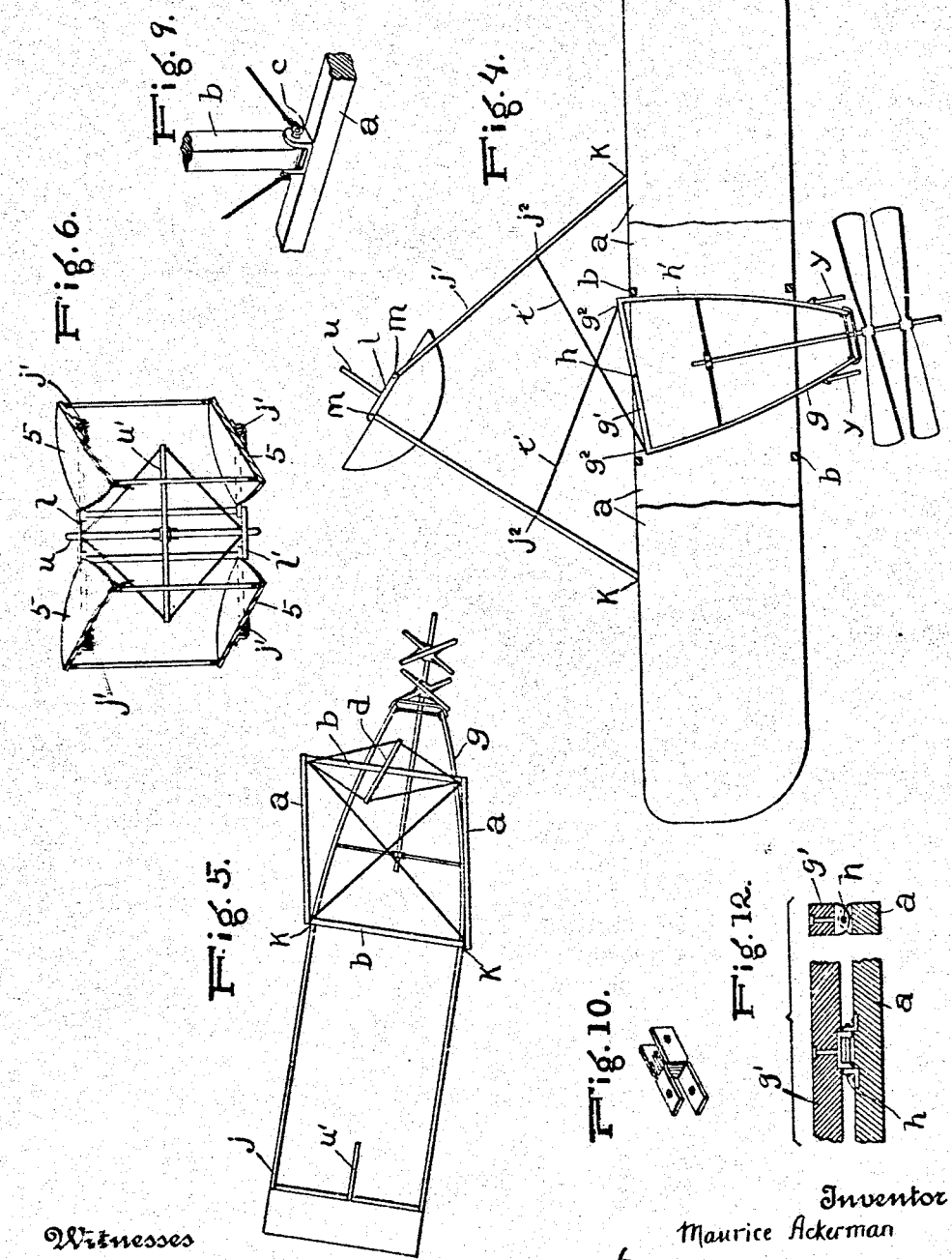

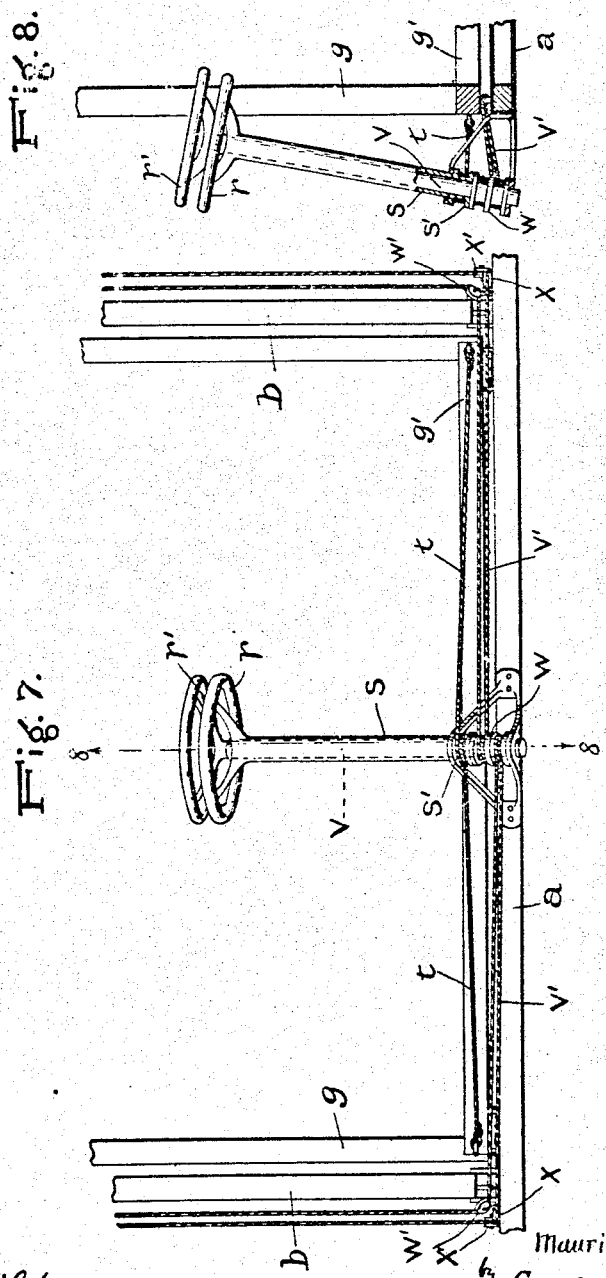

MAURICE ACKERMAN, OF WASHINGTON, DISTRICT OF COLUMBIA.

FLYING-MACHINE.

971,235.  Specification of Letters Patent.  Patented Sept. 27, 1910.

Application filed September 21, 1909. Serial No. 518,859.

*To all whom it may concern:*

Be it known that I, MAURICE ACKERMAN, a citizen of the Dominion of Canada, resident of Washington, in the District of Columbia, have made a certain new and useful Invention in Flying-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the invention, with parts broken away. Fig. 2 is a side view of the invention. Fig. 3 is a section on the line $3^a$—$3^a$ Fig. 1. Fig. 4 is a plan view on a smaller scale with parts broken away and parts removed, showing the opposite lateral adjustment of the rearward extending cage and the forward extending frame. Fig. 5 is a side view on a smaller scale with parts removed showing the vertical adjustment of the rearward extending cage and the forward extending frame. Fig. 6 is a section on the line $6^a$—$6^a$, Fig. 1, with the wings inclined. Fig. 7 is a detail front view illustrating the cable connections with the steering wheels. Fig. 8 is a section on the line 8—8 Fig. 7 with parts not in section. Fig. 9 is a detail perspective view of one of the horizontal pivot joint connections between a vertical brace bar and the upper and lower aeroplanes. Fig. 10 is a detail perspective view of the rigid joint connection between the forward vertical and horizontal rudders. Fig. 11 is a detail side view showing a modification of the narrow rear plane between the upper and lower aeroplanes. Fig. 12 shows detail sectional views of the universal joint connection of the main supporting planes and the carrier cage.

The invention has relation to flying machines, and it consists in the novel construction and combinations of parts as hereinafter set forth.

In the accompanying drawings, illustrating the invention, the letters $a$, $a$, designate parallel supporting aeroplanes having upright brace rod connections $b$, $b$, having a horizontal pivot joint connection to the framework of the aeroplanes $a$, $a$, at $c$, $c$, whereby said planes are allowed a forward or back parallel movement with respect to each other. Between and at the rear of the planes $a$, $a$, about midway of the distance separating the same, is a narrow plane $d$, having a downward inclination from front to rear and being fixed with relation to the rear brace rods $b$, $b$, which it intersects, diagonal brace wires being provided therefor at $f$, $f$.

Arranged centrally of and between the aeroplanes $a$, $a$, is a carrier cage $g$, consisting of forward upper and lower horizontal frame rods $g'$, having central universal joint connection to the upper and lower planes $a$, $a$, at $h$, $h$, said horizontal rods carrying rearward extending converging arched frame rods $h'$, four in number as shown, and connected at their rear ends by parallel metal plates $i$, $i$, to form a rigid structure which is designed to be movable however with respect to the planes $a$, $a$, upon the universal joint connections aforesaid.

Extending forward of the planes $a$, $a$, is a framework $j$, consisting of upper and lower parallel frame rods $j'$, $j'$, at each side, the two upper rods $j'$, $j'$, converging from rear to front, as do also the two lower rods, each rod $j'$, having a universal joint connection at $k$, with the framework of the planes $a$, $a$.

The frame $j$, has the two upper rods $j'$, thereof connected at their forward ends by a short cross rod $l$, the two lower rods $j'$, being similarly connected by a cross rod $l'$, the connection of each end of each cross rod to each rod $j'$, being by a vertical pivot joint $m$, allowing the cross rod to be turned to one side or the other to alter its angular relation to the rods $j'$, the rods $j'$, at the same time moving laterally slightly with respect to each other. The frame $j$, has the rods $j'$, thereof braced at $n$, as also cross braces $n'$. In this way the frame $j$, cannot alter its position vertically while the main supporting planes $a$, $a$, are immovable, and a movement vertically up or down of the frame $j$, can only come about by a parallel movement of the planes $a$, $a$. The same is true of the carrier cage $g$, which extends rearward with respect to its universal joint connection with the planes $a$, $a$, while the frame $j$, extends forward of such connection, the frame $j$, and the carrier cage thus acting as an effectual balance to each other and to the planes $a$, $a$, which are kept in normal position with the frame rods $b$, $b$, thereof vertical, all parts being free to move as stated but having no strain thereupon whereby they would be caused to take any movement whatever. Thus the supporting planes a, a, are free to have a limited forward or rear parallel movement, being otherwise rigid; the inner carrier cage is free to move up or down upon the universal joints h, h, simultaneously with a parallel movement of the planes a, a, the frame bars of the cage having a rigid connection with each other, said cage being also free to move sidewise upon said universal joints; and the forward extending frame j, is similarly free to move up or down or to have a limited lateral movement with the carrier cage, the bars j', of said frame at each side having a rigid brace connection with each other.

The carrier cage g, carries the motor o, having gear and chain connection o', with the propeller shaft p, said shaft having journal bearings in the plates i, i, double propellers p', being provided upon such shaft, each propeller having two oppositely extending blades q, q, arranged at an angle to each other, the blades of the two propellers upon the same side being also arranged at an angle to each other. The two propellers are caused to turn in opposite directions by the gearing $q^x$. The operator sits within the carrier cage g, in position to operate the controlling wheels r, r', the wheel r, having a sleeve stem s, carrying a reel s', upon which are oppositely wound flexible cables or wires t, running to opposite ends of the lower horizontal bar g', of the cage and designed to exert a pull thereupon at one side or the other to turn the carrier cage with its rear vertical rudders y, y, laterally, as shown diagrammatically in Fig. 4 of the drawing. At the same time laterally extending rods or cables t', having connection to the forward extending frame j, at $j^2$, and to opposite sides of the carrier cage g, at $g^2$, will cause the upper and lower rigidly connected rods j', at each side to move laterally with respect to each other, causing the cross piece connections l, l', thereof, which are normally parallel to the longitudinal edges of the planes a, a, to be turned to one side or the other as the case may be, as shown in Fig. 4, a normally vertical forward steering plane or rudder u, rigidly connected with said cross pieces, turning therewith angularly with respect to the rear vertical rudders, as will also a normally horizontal segment-form horizontal rudder u'. In this way a lateral turn of the machine as a whole may be made, the carrier cage g, and the propeller mechanism and rear vertical rudders being turned to one side upon the universal joint connections h, h, and the forward extending frame j, being slightly twisted to turn the forward vertical rudder to one side, when a reverse movement of the parts is given to restore the parts to normal position and fly straight ahead in the new direction.

When it is desired to cause the flight of the machine to assume an upward or downward direction, as in starting the ascension or alighting, the controlling wheel r', is operated by the driver, said wheel having a stem v, which extends within the tubular stem of the wheel r, flexible wires or cables v'', being oppositely wound upon a reel w, of the stem v, passing one laterally over guide pulleys w', and thence diagonally of the planes a, a, upward and rearward to the rear edge of the upper plane a, and the other laterally over guide pulley x, thence rearward over guide pulley x', and thence diagonally of the planes a, a, upward and forward to the forward edge of the upper plane a. The wires v', v', are duplicated upon opposite sides of the machine, as shown in Fig. 7. In this manner, upon movement of the wheel r', to one side, the wire or cable v', will have a pull exerted thereupon to cause a parallel movement of the planes, which slightly approach each other, as shown in Fig. 5 of the drawings, the carrier cage g, and the propellers being at the same time moved downward upon the universal joint connections h, h, and the forward projecting frame j, with the horizontal rudder u', being at the same time moved upward in the direction which it is desired to travel. A reverse adjustment of the wheel r', and the parts controlled thereby will similarly cause the flight to assume a downward direction.

The machine when upon the ground rests upon a base frame 1, pivoted about centrally thereof to the lower plane framework at 2. The lower frame rod 3, of this base frame has an upward inclination from its rear end, which is designed to rest upon the runways, the forward end of the frame carrying wheels 4, 4.

Wings 5, 5, are pivoted longitudinally thereof to the upper rods j', j', of the frame j, said wings being capable of assuming a downward and inward inclination toward each other upon their pivots when it is desired to right the machine in case its equilibrium or balance is disturbed in a descent. This movement of the wings 5, 5, is brought about by pressure of the foot of the driver upon the forward end of the base frame when the machine is in the air, rods 6, 6, running from the forward end of the frame to the inner edges of the wings for this purpose. A spring 7, connecting the rear end of the base frame with the framework of the lower plane a, will cause the base frame and the wings 5, 5, to assume normal horizontal positions when the foot pressure is released.

In Fig. 11 of the drawings is shown a modification wherein the narrow rear plane $d$ is pivoted centrally to the rear brace bars $b$, $b$, at $d'$, the brace rods $f$, $f$, having turnbuckles $f'$ whereby the inclination of the plane $d$ may be varied with respect to the upper and lower aeroplanes. The function of this plane $d$, is mainly to exercise a lifting action upon the machine in its flight. This lifting action may be increased or decreased in accordance with the weight of the machine and its occupants, by varying the inclination of the plane $d$.

Having thus described my invention, what I claim as new and desire to secure by Letters Patent is:

1. In a flying machine, upper and lower parallel aeroplanes, upright brace rods having a horizontal pivot joint connection with said aeroplanes, a rearward extending cage having upper and lower universal joint connections with said aeroplanes and a forward extending frame having also upper and lower universal joint connections with the aeroplanes.

2. In a flying machine, upper and lower parallel aeroplanes capable of a parallel movement with respect to each other, rearward extending balancing means carrying the motor and propeller mechanism, and forward extending balancing means carrying rudder mechanism.

3. In a flying machine, upper and lower parallel aeroplanes capable of a parallel movement with respect to each other, rearward extending balancing means carrying the motor and propeller mechanism, forward extending balancing means carrying rudder mechanism, said forward and rearward extending balancing means having separate universal joint connection with the aeroplanes and being capable of automatically assuming an inclined position for upward or downward flight with the parallel movement of the aeroplanes.

4. In a flying machine, upper and lower parallel aeroplanes capable of parallel movement with respect to each other, rearward extending balancing means carrying the motor and propeller mechanism, forward extending balancing means carrying rudder mechanism, and means for turning said rudder mechanism horizontally and simultaneously turning the propeller mechanism horizontally in opposite directions.

5. In a flying machine, upper and lower parallel aeroplanes capable of a parallel movement with respect to each other, a rearward extending cage having upper and lower universal joint connection with the aeroplanes and carrying the motor and propeller mechanism, a forward extending frame carrying rudder mechanism and having also upper and lower universal joint connection with the aeroplanes, and means for turning said cage and propeller mechanism horizontally and simultaneously turning said forward extending frame and rudder mechanism horizontally in opposite directions.

6. In a flying machine, upper and lower parallel aeroplanes capable of a parallel movement with respect to each other, a rearward extending cage having upper and lower universal joint connections with said aeroplanes and having rearward extending converging frame rods provided with rear metal connections, said cage carrying the motor and propeller mechanism, the propeller shaft having journal bearings in said metal connections, and a forward extending frame having upper and lower universal joint connections with said aeroplanes and carrying rudder mechanism.

7. In a flying machine, upper and lower parallel aeroplanes capable of parallel movement with respect to each other, a rearward extending cage having upper and lower universal joint connections with said aeroplanes and having rearward extending converging frame rods provided with rear metal connections, said cage carrying the motor and propeller mechanism, the propeller shaft having journal bearings in said metal connections, a forward extending frame having upper and lower universal joint connections with said aeroplanes and carrying rudder mechanism, and means for simultaneously turning said cage and frame horizontally in opposite directions.

8. In a flying machine, upper and lower parallel aeroplanes capable of parallel movement with respect to each other, a rearward extending cage having upper and lower universal joint connections with said aeroplanes, said cage carrying the motor and propeller mechanism, the propeller shaft having double propellers capable of rotating in opposite directions, the blades upon the same side being angularly disposed with relation to each other and the blades upon opposite sides of the same propeller being angularly disposed with relation to each other, and a forward extending frame having also upper and lower universal joint connections with the aeroplanes and carrying rudder mechanism.

9. In a flying machine, upper and lower parallel aeroplanes capable of a parallel movement with respect to each other, a rearward extending cage having upper and lower universal joint connections with said aeroplanes and carrying the motor and propeller mechanism, a forward extending frame having also upper and lower universal joint connection with said aeroplanes, said frame having upper and lower pairs of converging frame rods having a vertically pivoted cross piece connection at their forward ends, said cross piece connection carrying a vertical rudder and a horizontal rudder, and means for simultaneously turning said cage with its propeller mechanism and said frame with its rudders horizontally in opposite directions.

10. In a flying machine, upper and lower parallel aeroplanes capable of parallel movement with respect to each other, a rearward extending cage carrying the motor and propeller mechanism and having upper and lower universal joint connections with said aeroplanes, a forward extending frame carrying rudder mechanism, having also upper and lower universal joint connection with said aeroplanes, normally horizontal wings and means for causing said wings to assume a downward inclination toward each other.

11. In a flying machine, upper and lower parallel aeroplanes capable of parallel movement with respect to each other, a rearward extending cage carrying the motor and propeller mechanism and having upper and lower universal joint connections with said aeroplanes, a forward extending frame carrying rudder mechanism, having also upper and lower universal joint connections with said aeroplanes, normally horizontal wings and foot pressure means for causing said wings to assume a downward inclination toward each other.

12. In a flying machine, upper and lower parallel aeroplanes capable of a parallel movement with respect to each other, a rearward extending cage carrying the motor and propeller mechanism and having upper and lower universal joint connections with said aeroplanes, a forward extending frame carrying rudder mechanism and having also upper and lower universal joint connection with said aeroplanes, a base frame having pivotal connection with said aeroplanes, a spring for maintaining said base frame in normal position, and normally horizontal wings capable of assuming a downward inclination toward each other and having operating connection with said base frame.

13. In a flying machine, upper and lower parallel aeroplanes, forward and rear vertical brace rods having a horizontal pivot connection with said aeroplanes, a narrow horizontally inclined plane having rigid connection with the rear brace rods, a rearward extending cage having upper and lower universal joint connection with said aeroplanes and carrying motor and propeller mechanism and a vertical rudder, and a forward extending frame having upper and lower universal joint connection with said aeroplanes and carrying rudder mechanism.

In testimony whereof I affix my signature, in presence of two witnesses.

MAURICE ACKERMAN.

Witnesses:
RICHARD A. CURTIN,
HYMEN GOLDMAN.